Dec. 12, 1967 — L. M. SANDERS — 3,357,180
SYNCHRONIZED FLUID COUPLING
Filed Jan. 21, 1966
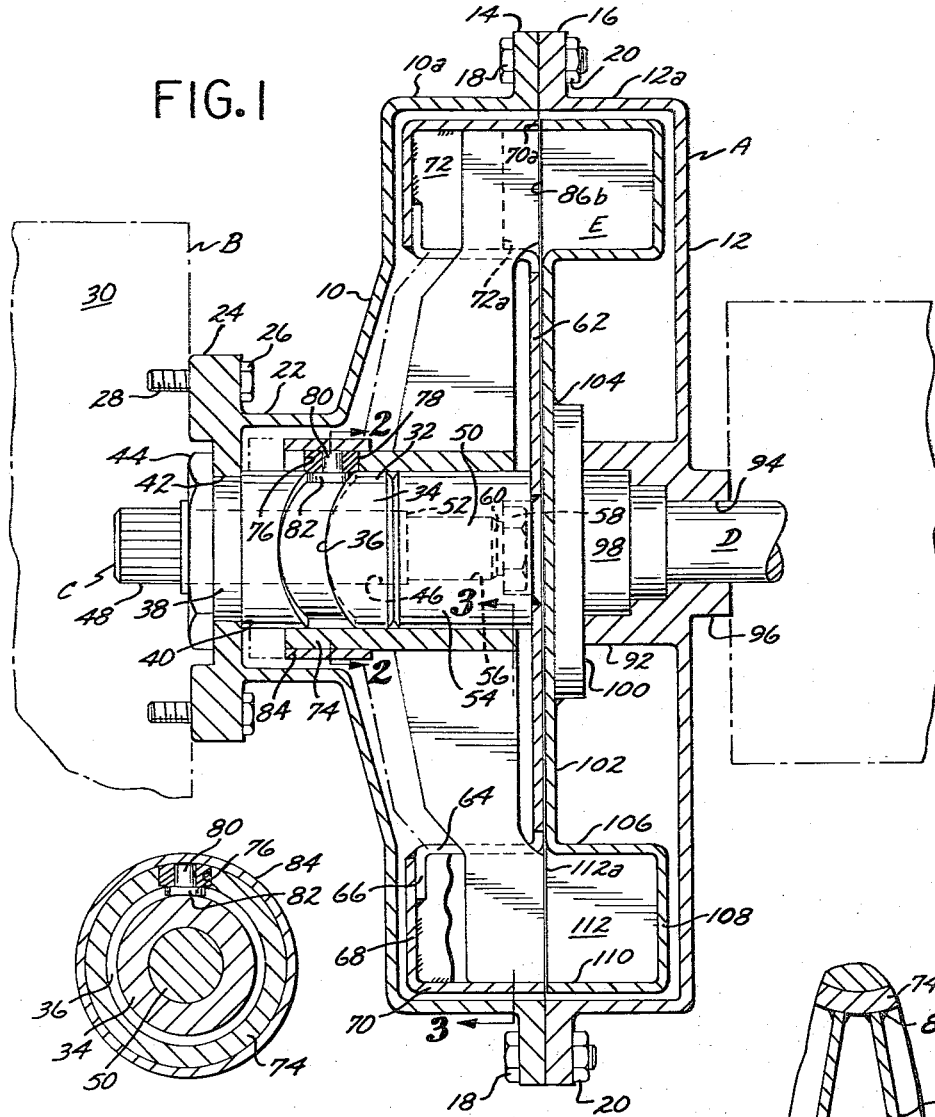
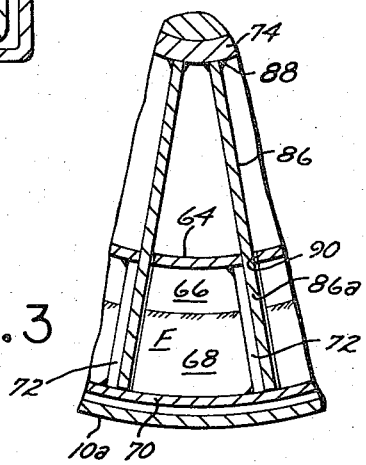
INVENTOR.
LAWRENCE M. SANDERS
BY William C. Babcock
ATTORNEY United States Patent Office 3,357,180
Patented Dec. 12, 1967

3,357,180
SYNCHRONIZED FLUID COUPLING
Lawrence M. Sanders, Renton, Wash.
(121 E. 10th St., Dallas, Tex. 75203)
Filed Jan. 21, 1966, Ser. No. 522,221
7 Claims. (Cl. 60—54)

The present invention relates generally to couplings, and more particularly to a fluid coupler that is so synchronized with power strokes of a two or four cylinder internal combustion engine that torque is delivered smoothly to a driven shaft during the entire firing cycle of the engine.

In the powering of automotive vehicles, it is common practice to employ either a six or eight cylinder engine, for in the past internal combustion engines having fewer cylinders have been incapable of delivering a smooth flow of torque to the driven shaft. In the operation of an internal combustion engine, the maximum torque is delivered by the engine during the power stroke, and in two and four cylinder engines, the driven shaft is sequentially subjected to intermittently spaced surges of power as a result thereof. This deficiency in the operation of two and four cylinder engines has seriously restricted the use thereof in automotive vehicles, even though such engines provide a high power-to-weight ratio, involve a low maintenance cost, and are relatively simple and easy to repair.

A major object of the present invention is to provide a synchronized fluid coupling adapted to be used with a two or four cylinder engine to deliver a smooth flow of power therefrom to a driven shaft whereby such an engine may replace a six or eight cylinder engine without loss of performance or efficiency.

Another object of the invention is to supply a synchronized fluid coupling in which the coupling between the driving and driven shafts is progressively varied during the power stroke to permit a smooth flow of torque to the driven shaft.

Another object of the invention is to provide a synchronized fluid coupling that will greatly reduce the stress to which a two or four cylinder engine is subjected during operation, to permit a smooth flow of power from the engine to a torque converter and thereby improve the converter performance.

Another object of the invention is to furnish a synchronized fluid coupling of simple mechanical structure which may be fabricated from standard, commercially available materials, requires little or no maintenance, and can be of sufficiently compact form to be placed under the hood of a conventional automobile adjacent the engine thereof.

These and other objects and advantages of the invention will become apparent from the following description of a preferred form thereof, and from the accompanying drawing illustrating the same, in which:

FIGURE 1 is a longitudinal cross-sectional view of the synchronized fluid coupling connected to a driven and a driving shaft;

FIGURE 2 is a transverse cross-sectional view of the device, taken on the line 2—2 of FIGURE 1; and FIGURE 3 is a fragmentary longitudinal cross-sectional view of the coupling, taken on the line 3—3 of FIGURE 1.

With continued reference to the drawing for the general arrangement of the invention, it will be seen in FIGURES 1 and 3 to include a cylindrical housing A formed from a suitable rigid metallic material comprising a forward circular wall 10 and rear circular wall 12. A short side wall 10a projects rearwardly from the periphery of wall 10 and the rear extremity of wall 10a develops into an outwardly extending flange 14.

A side wall 12a extends forwardly from wall 12, and the forward extremity thereof develops into an outwardly extending flange 16. Flanges 14 and 16 are in abutting contact and removably held together by a number of circumferentially spaced bolts 18 that project through openings (not shown) formed in these flanges, which bolts are engaged by nuts 20, as shown in FIGURE 1.

The forward wall 10 (FIGURE 1) develops into a forwardly extending tubular portion 22. The forward end of portion 22 in turn develops into a ring 24 through which a number of circumferentially extending bolts 26 extend through openings (not shown) formed therein to engage tapped bores 28 provided in the block or body portion 30 of an internal combustion engine B that may be either of a two cylinder, two cycle, or four cylinder, four cycle type.

A cylindrical cam 32 is provided that includes a forward portion 34 in which a circumferentially extending cam slot 36 is defined. A second portion 38 extends forwardly from portion 34, and at the junction of these two portions a body shoulder 40 is defined. Portion 38 fits snugly within the central opening 42 of the ring 24, with the body shoulder 40 abutting against the rear surface of the ring. Threads (not shown) are formed on portion 38 that are engaged by a lock nut 44 that abuts against the forward face of the ring 24 and holds the cam 32 in a fixed position relative thereto. A bore 46 is formed in cam 32 which extends longitudinally through the portions 34 and 38.

A driving shaft C is provided that has a splined forward end 48 which is driven by the engine B, with the shaft C extending rearwardly through the bore 46 to a position beyond the rear extremity thereof. A circular body shoulder 52 is formed on shaft C at the junction between a rear extension 50 provided thereon and the forwardly disposed portion of the shaft, as may be seen in FIGURE 1.

A hub 54 is provided in which a longitudinally extending bore 56 is formed that snugly engages the rear of the driving shaft C, and is removably supported thereon by a nut 58 which engages threads 60 formed on the rear of the shaft portion 50 (FIGURE 1). Hub 54 supports a forwardly disposed, circular, rotatable member 62, and the periphery thereof develops into a forwardly extending flange 64 which in turn develops into an outwardly extending lip 66. A ring-shaped member 68 is secured to lip 66 and extends outwardly therefrom. The outer end of lip 66 develops into a second flange 70 that is concentrically positioned relative to the flange 64, but radially spaced therefrom.

A number of circumferentially spaced, radially extending fixed vanes 72 are secured to the inner surfaces of flanges 64 and 70 by welding beads or the like, and the forward edges of these vanes are in abutting contact with the rear surface of ring-shaped member 68. The rear edges 72a are disposed forwardly a substantial distance from the rear edges of flanges 64 and 70. A tubular sleeve 74 is rotatably and slidably mounted on the hub 54 and cam member 32, and an opening 76 is formed in this sleeve that is occupied by an insert 78 from which a pin 80 depends on which a cam follower 82 is mounted that movably engages the cam slot 36. The insert 78 is removably held in opening 76 by a band 84 that frictionally grips the exterior surface of the sleeve 74, as can be seen in FIGURES 1 and 2.

A number of circumferentially spaced, radially extending movable vanes 86 project outwardly from sleeve 74 and are secured thereto by welding beads 88, as shown in FIGURE 3. The outer portion of vanes 86 are slidably positioned in circumferentially spaced, longitudinally extending slots 90 formed in flange 64, with these vanes being in slidable contact with the fixed vanes 72.

Vanes 86 have outer end portions 86a, the width of which is substantially less than the distance between the rear extremities of the flange 64 and lip 66. The vane portions 86a also have rearwardly extending edges 86b that may be substantially flush with the rear extremity 70a of flange 70, as shown in FIGURE 1, and by forward movement of vanes 86, the edges 86b may be brought into substantial alignment with the rear edges 72a of the fixed vane 72.

A cylindrical boss 92 (FIGURE 1) extends forwardly from the wall 12, and is in communication with a bore 94 formed in a central portion 96 of this wall. The boss 92 supports bearings 98 that rotatably support the forward portion of a driven shaft D, on the forward end of which a circular plate 100 is mounted. A rearwardly rotatable member 102 of circular shape is rigidly affixed to plate 100 by welding beads 104, or the like. The peripheral edge of plate 100 develops into a rearwardly extending flange 106, which on its rear end develops into a rigid ring 108 that is parallel to the ring 68. The peripheral edge of ring 108 develops into a forwardly projecting flange 110.

A number of circumferentially spaced, radially extending fixed vanes 112 are secured to the interior surfaces of flanges 106 and 110 and abut against the forward face of the ring 108, as shown in FIGURE 1. The fixed vanes 112, together with flanges 106 and 110 and ring 108 cooperatively define a number of rearwardly extending cups E, the forward ends of which are open. The fixed vanes 72 cooperate with the flanges 64 and 70, and the ring 68 (FIGURE 3) to define a number of circumferentially extending cups F, the rear ends of which are open. The rear extremity of cups F are defined by the edges 72a of the fixed vane 72, which edges are spaced a substantial distance from the forward edges 112a of the fixed vanes 112, as may be seen in FIGURE 1.

The operation of the invention is relatively simple. The housing A is filled with a suitable liquid, such as is conventional in torque converters. Conventional means (not shown) are employed to introduce the liquid into housing A.

When the driving shaft C is rotated by the engine B, the vanes 86, due to engagement with the slots 90, are rotated, and the vanes are also moved longitudinally relative to the hub 54, due to movement of the cam follower 82 in the slot 36. The slot 36 is curved, and is so disposed that as the engine B starts a power stroke, the vanes 86 start to be moved forwardly to increase the longitudinal spacing thereof relative to the edges 112a that define the forward extremity of the engine B. As the vanes 86 are so moved forwardly, less torque is transmitted to the cups E, and the driven shaft D is not subjected to intermittent surges of power as would occur when the present invention is not used as a coupling between the driving shaft C and driven shaft D.

At the end of the power stroke, the operation just described is reversed, with the vanes 86 then moving rearwardly until they have attained the position shown in FIGURE 1, where maximum coupling between the cups E and F occurs. This maximum coupling between cups E and F preferably occurs at the beginning of the power stroke. Correct positioning of the cam slot 36 relative to the engine B to permit synchronization of the vanes 86 with the power stroke in the manner described, is carried out by loosening the nut 44 and rotating the cam 32 to a position where the desired result is attained.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A fluid coupling for an internal combustion engine having one or more equally spaced power strokes per revolution, and a driving shaft projecting therefrom, comprising in combination:
 (a) a hollow rigid fluid holding housing having an apertured forward wall and an apertured rear wall, with said driving shaft extending rearwardly into said housing;
 (b) first means for holding said housing in a fixed position relative to said engine;
 (c) a tubular cam disposed in a fixed location in said housing, which cam has a circumferentially extending slot formed on the exterior surface thereof, and through which cam said driving shaft extends rearwardly;
 (d) a driven shaft that extends forwardly into said housing through said apertured rear wall and in coaxial alignment with said driving shaft;
 (e) adjacent forward and rear rotatable members disposed in said housing and rigidly connected to said driven and driving shafts respectively;
 (f) a plurality of cups that extend rearwardly from the periphery of said rear members;
 (g) a plurality of forwardly extending cups mounted on the periphery of said forward member;
 (h) a tubular sleeve rotatably and slidably mounted on said cam;
 (i) a cam follower mounted on said sleeve that movably engages said cam slot;
 (j) a plurality of circumferentially spaced, radially extending movable vanes that project outwardly from said sleeve to positions adjacent said forwardly extending cups, which vanes are capable of moving rearwardly and forwardly relative to the rear extremities of said forwardly extending cups; and
 (k) means for rotating said movable vanes and said sleeve during rotation of said driving shaft, which sleeve and vanes as they rotate are moved forwardly by said follower to positions where the fluid coupling between said rearwardly extending cups and said forwardly extending cups and vanes are progressively lessened during each power stroke of said engine to transmit power smoothly from said driving to said driven shaft during the entire firing cycle of said engine.

2. A fluid coupling as defined in claim 1, in which said first means comprises:
 (1) a tubular member that extends forwardly from an opening formed in said forward wall;
 (m) a ring on the forward end of said tubular member, in which ring a plurality of circumferentially spaced openings are formed; and
 (n) a plurality of bolts which project through said openings and engage tapped bores formed in said engine to support said coupling therefrom.

3. A fluid coupling as defined in claim 2, wherein said forward and rear rotatable members are circular plates.

4. A fluid coupling as defined in claim 2 wherein said rearwardly extending cups are defined by:
 (1) a first flange that extends rearwardly from the periphery of said rear member;
 (m) a ring which extends outwardly from the rear edge of said first flanges;
 (n) a second flange that extends forwardly from the outer edge of said ring; and
 (o) a plurality of circumferentially spaced, radially extending vanes rigidly secured to the interior surfaces of said first and second flanges which vanes abut against the forward surface of said ring.

5. A fluid coupling as defined in claim 2, wherein said forwardly extending cups are defined by:
 (p) a first flange that extends forwardly from the periphery of said forward member;
 (q) a ring that extends outwardly from the forward edge of said first flange;

(r) a second flange that extends rearwardly from the periphery of said ring; and (s) a plurality of circumferentially spaced, radially extending fixed vanes rigidly secured to the interior surfaces of said first and second flanges, which vanes abut against the rear surface of said ring.

6. A fluid coupling as defined in claim 5, wherein said means for rotating said movable vanes comprises a plurality of longitudinally extending slots formed in said first flange that are slidably engaged by said movable vanes.

7. A fluid coupling as defined in claim 6, in which said movable vanes have outer portions thereof adjacently disposed to said fixed vanes and can move rearwardly and forwardly relative thereto.

References Cited
UNITED STATES PATENTS

| | | | |
|---|---|---|---|
| 2,024,698 | 12/1935 | McDougall | 60—54 X |
| 2,359,930 | 10/1944 | Miller | 60—54 |
| 2,417,964 | 3/1947 | Becker | 60—54 |

EDGAR W. GEOGHEGAN, *Primary Examiner.*